Aug. 20, 1968  E. K. KARLSSON  3,397,778
ROTARY SUCTION TYPE CLEANING SYSTEM
Filed March 10, 1966  2 Sheets-Sheet 1
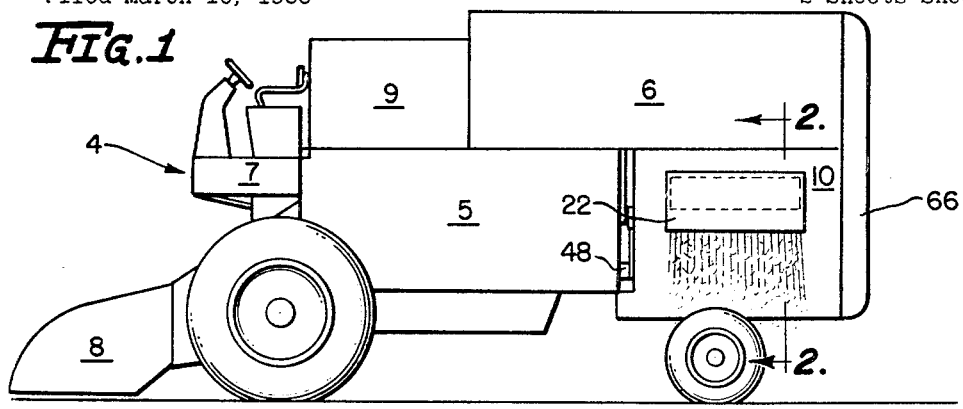
FIG.1
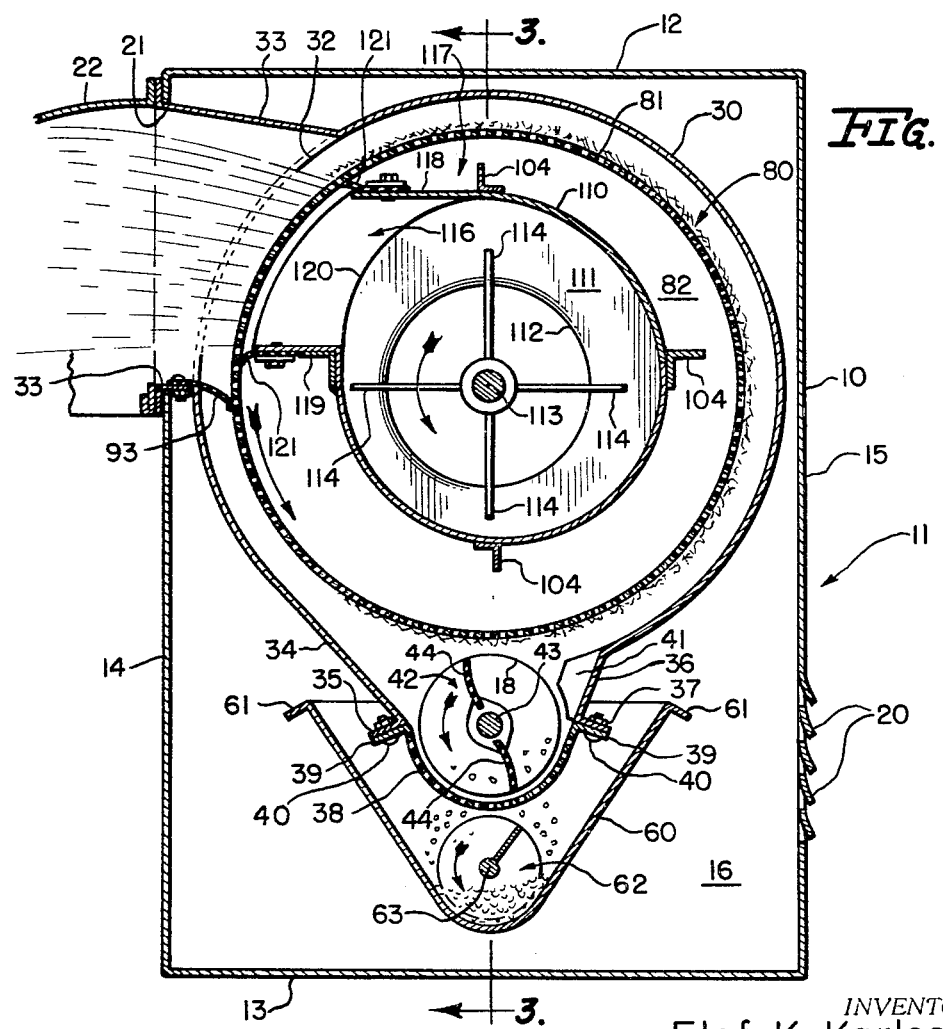
FIG.2
INVENTOR.
Elof K. Karlsson
Attorney

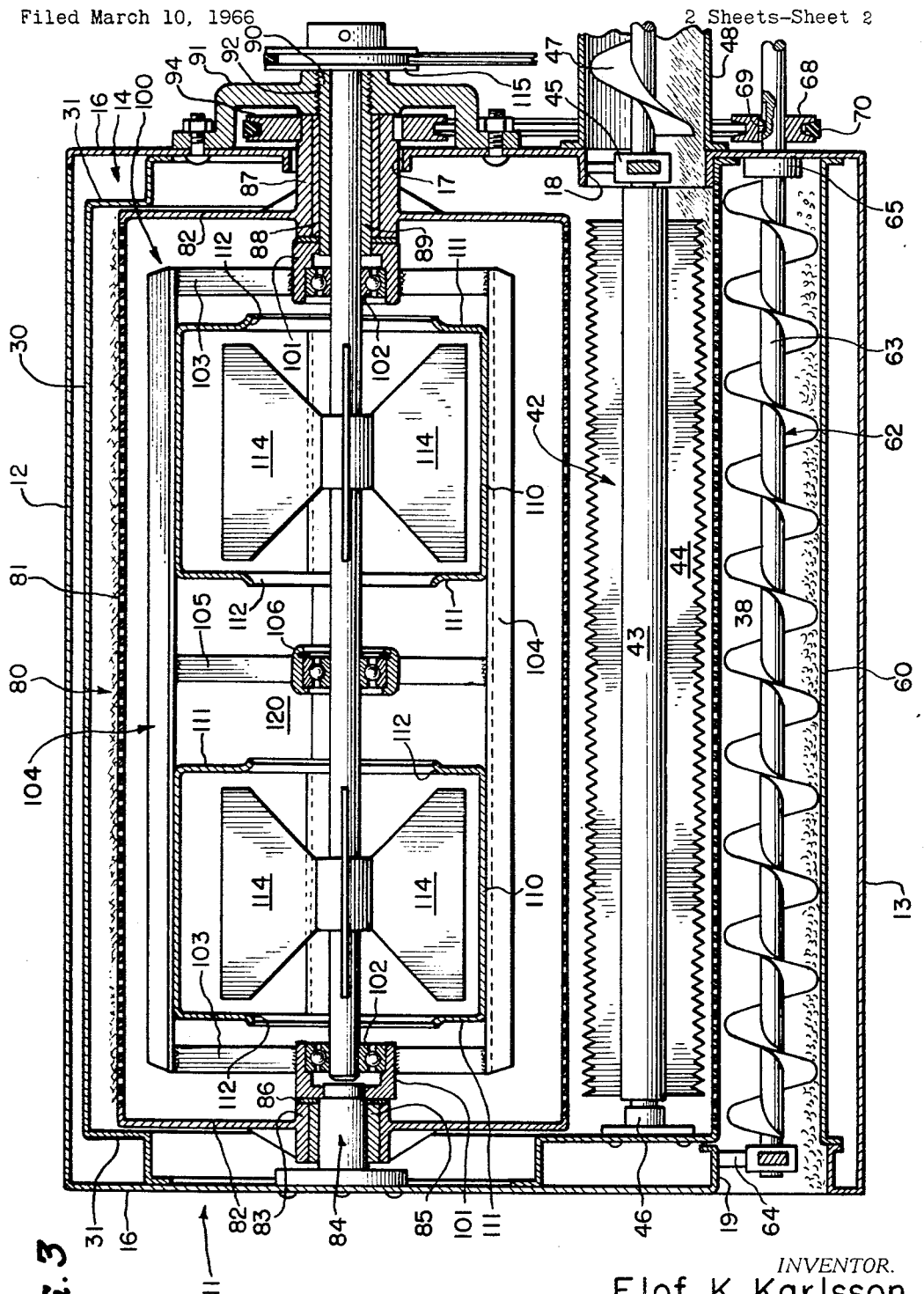

United States Patent Office 3,397,778
Patented Aug. 20, 1968

3,397,778
ROTARY SUCTION TYPE CLEANING SYSTEM
Elof K. Karlsson, East Moline, Ill., assignor to International Harvester Company, Chicago, Ill., a corporation of Delaware
Filed Mar. 10, 1966, Ser. No. 533,190
10 Claims. (Cl. 209—23)

The present invention relates generally to improvements in grain cleaning devices and the like and more particularly to a new and improved rotary suction type cleaning system adaptable for use with a rotary type combine.

Throughout the development of the combine the ultimate goal has been to more thoroughly separate the grain from the trash and thus deposit a cleaner grain sample in the grain tank. Since the combine is a field going machine the compactness and weight of the various units is always an important consideration in the development of a new unit.

The cleaning unit of a combine receives the grain in a trash-contaminated condition after it has been processed by the thrashing and separating units of the combine. The material received by the cleaning unit will normally include trash such as chaff, weeds and cockleburrs and it is the purpose of the cleaning unit to separate this trash from the grain. The cleaning units on a conventional combine normally include a reciprocating grain pan and a series of sieves through which a stream of air is directed. A cleaning system such as this is heavy and occupies a considerably large volume of space in the conventional combine.

The general purpose of this invention is to provide a grain cleaning unit which embraces all of the advantages of conventional cleaning units and yet is more compact, lighter and includes a much simpler drive mechanism. To attain this the present invention contemplates a unique arrangement of a rotary perforated drum, means for creating a vacuum in the interior of the drum such that a blanket of debris will be collected on its outer surface and discharged at a selected point by a concentrated blast of air originating in the interior of the perforated drum. The subject cleaning device utilizes simple rotary drives and thus avoids the creation of vibrations which is inherent in the above referred to conventional drives. A fan device is used to create the vacuum within the perforated drum and the restricted blast of air used to discharge the blanket of debris from the outer surface of the perforated drum. The drives for the perforated drum and the fan are compact in that they are arranged along a common axis.

A perforated trough is located beneath the rotary perforated drum and is adapted to receive the unclean material. An agitator is located within this trough causing the light trash to be thrown against the outer surface of the rotary perforated drum. A generally cylindrical casing made of air impervious material surrounds the rotary perforated drum and is connected to the upper edges of the perforated trough. This arrangement requires that the air drawn into the fan intake be directed through the perforated trough and this stream of air cooperates with the agitator to deposit the trash on the surface of the rotary perforated drum.

This cleaning unit is particularly adaptable for use with a combine of the type having rotary thrashing and separating units. In a combine of this type the thrashing and the separating unit have generally cylindrical shapes and are in alignment with each other. A rotor is journalled about the center of the cylindrical thrashing and separating units and the material moves in a path parallel to the rotor axis. For a disclosure of a rotary type combine reference may be made to the Strong et al. Patent 1,534,426 of Apr. 12, 1925.

An object of the present invention is the provisions of a grain cleaning unit that is adaptable for use with a rotary type combine.

Another object is to provide a grain cleaning unit having a rotary perforated drum that is adapted to pneumatically pick up a blanket of trash on its outer periphery and pneumatically discharge this blanket within a discharge area.

A further object of the invention is the provision of a grain cleaning unit having a rotary perforated drum with a fan unit located within the drum that is adapted to draw air through the rotary perforated drum and discharge it through the drum within a restricted area.

Still another object is to provide a grain cleaning unit including a perforated trough for containing the uncleaned grain and a rotary perforated drum located over the perforated trough and means located within the perforated drum for drawing air through the surface of the perforated drum and through the perforated trough.

These and other objects of the invention will become more apparent from the specification and drawings wherein:

FIGURE 1 is a side view of a rotary type combine having the subject grain cleaning unit incorporated therewith.

FIGURE 2 is a cross sectional view of the grain cleaning unit taken along lines 2—2 of FIGURE 1 and FIGURE 3 is a cross sectional view of the grain cleaning unit taken along lines 3—3 of FIGURE 2.

Referring now to the drawings wherein like reference characters designate like or corresponding parts throughout the several views there is shown in FIGURE 1 a combine generally designated 4 made up of a thrashing and separating unit 5, a grain tank 6, a header 8 and an engine section 9. The combine 4 is also provided with an operator's platform 7. The combine 4 shown in FIGURE 1 is intended to represent a rotary type combine of the type referred to above. During operation the combine 4 proceeds through the field the header 8 picks up crop and feeds it into the thrashing and separating unit 5 which discharges the straw and feeds the unclean grain through inlet tube 48 into the cleaning unit 10. The cleaning unit 10 then processes the unclean grain discharging the chaff and other trash to the ground and feeds the clean grain into a discharge elevator 66 which deposits it into the grain tank 6.

Referring now to FIGURES 2 and 3 a detailed description of the cleaning unit will be given. The cleaning unit has a rectangular shape formed by a housing or frame 11. The housing or frame 11 includes a top wall 12, a bottom wall 13, a first vertical side wall 14, a second vertical side wall 15 and end walls 16. The housing or frame is arranged such that its longitudinal axis lies parallel to the direction of travel of the combines 4. An opening 17 is formed in one end of the end walls 16 through which the drive for several elements of the cleaning units extend. A material inlet opening 18 is also formed in one of the end walls 16 and is aligned with the inlet tube 48 that connects the cleaning unit 10 with the thrashing and separating unit 5 of the combine. A clean grain exit opening 19 is formed in one of the end walls 16 and is aligned with the grain elevator 66 that functions to carry the grain to a storage place such as the grain tank 6. As shown in FIGURE 2 the second side wall 15 is formed with louvers 20 to permit air to enter the housing or frame 11. A discharge opening 21 is formed in the first side wall 14 and is surrounded by a trash deflector 22 as shall be described in greater detail later.

The generally cylindrical casing designated 30 is mounted within the housing 11 and includes end plates 31 that are secured to the end walls 16 of the housing. As can be best seen in FIGURE 2 the generally cylindrical casing 30 is formed with a rectangular opening 32 that is connected by a duct 33 to the discharge opening 21 formed in the housing 11. The generally cylindrical casing 30 has a V-shaped bottom made up of a tangential plate 34 terminating in a flange 35 and a plate 36 terminating in a flange 37. The plates 34 and 36 are joined by a perforated trough 38 having flanges 39 along its upper edges. The flanges 35 and 37 are connected to the flanges 39 by connecting means such as nuts and bolts 40. The perforated trough 38 is aligned with the material inlet opening 18 formed in the end wall 16 of the housing and is adapted to receive the unclean grain that is fed through inlet tube 48. An agitator 42 made up of a core 43 and rubber paddles 44 is located within perforated trough 38. The agitator 42 is supported at one end by a hanging bushing 45 and at the other end by a bushing 46. The hanging bushing 45 is located at the intake end of the perforated trough 38. As shown in FIGURE 3 a bushing 46 is carried by one of the end plates 31 of the generally cylindrical casing 30. The hanging bushing 45 also serves as a bushing for a feed auger 47 that is located within the inlet tube 48, the core 43 of the agitator is connected to the core of the feed auger 47 and receives its drive from the feed auger.

A clean grain collecting means is located below and around the perforated trough 38. This means includes a generally P-shaped clean grain trough 60 having upper edges 61. The clean grain trough 60 is supported by the end walls 16 of the housing and is located such that its bottom is aligned with the clean grain exit opening 19 formed in the end wall 16. A clean grain auger 62 including a core 63 is located in the clean grain trough 60. The clean grain auger is journalled at the end adjacent clean grain exit opening 19 by a hanging bushing 64. The other end of auger 62 is journalled by a bushing 65 carried by end wall 16. The core of auger 62 extends through the bushing 65 and end wall 16 and is driven by a rotary element external of the cleaning unit. A sheave 68 is secured to core 63 by a key 69 and is adapted to receive a belt 70 for transmitting rotary motion from core 63 to the rotary shaft 113 as shall be discussed in more detail. The end of the clean grain auger 62 that is supported by the hanging bushing 64 is adapted to discharge the clean grain into a grain elevator 66. The grain elevator 66 is shown in FIGURE 1 but is not shown in FIGURE 3.

A rotary perforated drum 80 is mounted concentrically of the generally cylindrical casing 30 and is made up of a perforated cylindrical tube 81 closed at its ends by end plates 82. As seen in FIGURE 3 the left end of the rotary perforated drum has a bearing sleeve 83 secured to the end plate 82. A bearing stub shaft 84 is carried by the end wall 16 of the cleaning unit housing 11 and is adapted to extend through the bearing sleeve 83. The bearing sleeve 83 is journalled on a bushing 85 that is carried by the stub shaft 84. A spring clip 86 is provided to hold the bushing 85 and the bearing sleeve 83 in proper position. The right-hand end of the rotary perforated drum 80, as seen in FIGURE 3, is provided with a bearing sleeve 87 that is journalled on a bushing 88 that is carried by a bearing stub shaft 89. The bearing stub shaft 89 is carried by the other end wall 16 of the cleaning housing 11. As shown in FIGURE 3 one end of bearing stub shaft 89 is threaded as indicated at 90 and is screwed into the internal threads 92 of a mount 91. The mount 91 is then secured by bolts of the like to the end walls 16 of the cleaning housing. A sheave 94 is secured to the bearing sleeve 87 externally of the cleaning housing 11 and in vertical alignment with the sheave 68. Sheaves 68 and 94 are connected by the belt 70 and thus rotary motion is supplied to the rotary perforated drum 80 through the same path as it is supplied to the clean grain auger 62.

A fan frame 100 is provided within the rotary perforated drum 80 and is supported by a pair of cup shaped supports 101 that are carried by stub shafts 84 and 89. The fan frame 100 includes vertical arms 103 extending radially from the cup shaped supports 101 and connected at their free ends by horizontal bars 104. As shown in FIGURE 3 the horizontal bars 104 are supported centrally by vertical bars 105. Bearings 102 are located within the cup shaped supports 101 and a bearing 106 aligned with bearings 102 is carried by the vertical bars 105. These bearings 102 and 106 form the support for the rotor shaft 113.

The fan frame 100 supports a fan casing 110, shown in the drawings to be in two separate units. Each of the units has end plates 111 formed with air intake openings 112. As can be best seen in FIGURE 2 the fan units have discharge openings 116 formed therein. A discharge duct designated 117 extends from the discharge openings 116 towards the internal surface of the rotary perforated drum 80. The discharge duct 117 includes a top plate 118 that spans across the two units of the fan casing, a bottom plate 119 that likewise spans across the two units of the fan casing and a rear connecting plate 120 that connects the two units of the fan casing. Elastomer seals 121 are secured to the edges of the discharged duct 117 and are adapted to engage the inner surface of the rotary perforated drum 80. An elastomer seal 93 is secured to the duct 33 of the generally cylindrical casing and extends inwardly into engagement with the outer surface of the rotary perforated drum 80.

*Operations*

The grain including chaff and other trash is conveyed through the inlet tube 48 by the feed auger 47 past the hanging bushing 45. This material then enters the perforated trough 38 where it comes into contact with the agitator 42. The rubber paddles 44 of the agitator 42 toss the material upwardly into engagement with the outer surface of the rotary perforated drum 80. Air is being drawn into the fan casing 110 through the openings 112 thus creating a low pressure zone within the rotary perforated drum 80 and externally of the fan casings 110. This low pressure zone causes air to flow through the perforations in the rotary perforated drum and causes the light chaff and other trash to adhere to the outer surface of the rotary perforated drum. A blanket of considerable thickness can be built up on this surface. The drum 80 as seen in FIGURE 2 rotates counterclockwise and encounters the discharge zone of the fan in the third quadrant (180°–270°) after passing over the agitator 42. All of the air drawn in by the fan is discharged through the discharge duct 117 which restricts this stream of air to a rectangular shaped area extending entirely across the inner surface of the rotary perforated drum 80. When the material that has adhered to the outer surface of the rotary perforated drum is brought into this stream of discharge air it is dislodged from the outer surface of the perforated drum and flows through duct 33 and out the discharge opening 21 formed in the cleaning unit housing. The trash deflector 22 is then encountered and functions to direct the trash downwardly towards the ground. The amount and weight of trash that will adhere to the outer surface of the rotary perforated drum 80 is of course a function of the capacity of the fan and can be varied by utilizing fans of different size or by varying the speed of a fan of a given size.

The air drawn into the fan is drawn through the perforations in the rotary perforated drum 80 and is supplied from the space between the rotary perforated drum 80 and the generally cylindrical casing 30. Since the generally cylindrical casing 30 is made of material that is air impervious all of this air flowing through the rotary perforated drum 80 is required to flow through the perforated trough 38. Thus, an up-draft of air is created within the perforated trough 38 and corporated with the agitator 42 to carry the chaff and other trash into engagement with the surface of the rotary perforated drum. A series of transport fins 41 extend upwardly from the plate 36 and function to guide the material in a straight path.

The clean grain is of such weight and density that it will not adhere to the outer surface of the rotary perforated drum and thus will continue to fall back into the perforated trough 38 and eventually will pass through perforations in the troughs and thus fall into the clean grain collecting means. The clean grain collecting means augers the clean grain in one direction and discharges it into an elevator or other means for conveying the grain to a storage area. The clean grain trough 60 is generally V-shaped and surrounds or envelopes the perforated trough 38. Thus the air drawn through the perforated trough 38 by the fan is required to flow through the clean grain 60 and will carry any minute particles of chaff that had fallen through the perforated trough 38 back through the trough where it can be discharged.

In FIGURE 3 a plurality of louvers 20 are shown located in the second side wall 15 of the cleaning unit housing. It should be noted that these louvers are located on the opposite side of the housing as is the trash discharge opening thus insuring that clean air will be drawn into the housing.

It should be understood of course that the foregoing disclosure relates to only a preferred embodiment of the invention and that numerous modifications may be made therein without departing from the spirit and scope of the invention as set forth in the appended claims.

What is claimed is:

1. A material separating device comprising a frame; an elongated perforated trough adapted to receive uncleaned grain, an agitator supported by said frame and located within said perforated trough; a rotary perforated drum supported by said frame and located over said perforated trough, a fan casing supported by said frame and located within said rotary perforated drum, said fan casing having an opening formed therein in communication with the interior of said rotary perforated drum, said fan casing having a discharge opening formed therein, said discharge opening being located such that it causes a restricted stream of air to be directed against the inner surface of said rotary perforated drum at a location remote from said perforated trough; a clean grain collecting means carried by said frame and located below in a receiving relationship to said perforated trough.

2. The invention as set forth in claim 1 wherein said frame includes a pair of spaced end walls, said end walls supporting axially aligned bearings upon which said rotary perforated drum is journalled, and said fan casing supported by said bearings within said rotary perforated drum.

3. The invention as disclosed in claim 1 wherein said rotary perforated drum has closed end-plates made of air impervious material.

4. The invention as set forth in claim 1 wherein said fan casing discharge opening is located such that the restricted stream of air is directed against an area of the inner surface of said rotary perforated drum in the quadrant 180°–270° beyond the point where said area passed over said perforated trough.

5. The invention as disclosed in claim 4 wherein said rotary perforated drum has closed end-plates made of air impervious material.

6. The invention as disclosed in claim 1 wherein a generally cylindrical casing made of air impervious material is supported by said frame and surrounds said rotary perforated drum, said cylindrical casing having an axially aligned opening located over said perforated trough, said perforated trough being connected along its upper edges to said cylindrical casing along the edges formed by said axially aligned opening, and said generally cylindrical casing having a discharge opening formed therein in alignment with the discharge opening formed in said fan casing.

7. The invention as set forth in claim 6 wherein said fan casing discharge opening is located such that the restricted stream of air is directed against an area of the inner surface of said rotary perforated drum in the quadrant 180°–270° beyond the point where said area passed over said perforated trough.

8. The invention as disclosed in claim 6 wherein said rotary perforated drum has closed end-plates made of air impervious material.

9. The invention as set forth in claim 6 wherein said frame includes a pair of spaced end walls made of air impervious material, said end walls supporting axially aligned bearings upon which said rotary perforated drum is journalled, said fan casing supported by said bearings within said rotary perforated drum and said generally cylindrical casing secured to said pair of spaced end walls such that the end walls close the ends of said generally cylindrical casing.

10. The invention as set forth in claim 9 wherein said frame also includes a first and second vertical side wall connecting said end walls and thereby enclosing said perforated trough, said generally cylindrical casing and said clean grain collecting means, a discharge opening formed in said first side wall and a duct connecting a discharge opening formed in said cylindrical casing and said first side wall.

References Cited
UNITED STATES PATENTS

| | | | |
|---|---|---|---|
| 486,592 | 11/1892 | Seip | 209—23 X |
| 859,457 | 7/1907 | Lyle | 209—28 |
| 2,200,472 | 5/1940 | Erdmann | 209—27 |

HARRY B. THORNTON, *Primary Examiner.*

TIM R. MILES, *Assistant Examiner.*